US011305560B2

(12) United States Patent
Ishii et al.

(10) Patent No.: US 11,305,560 B2
(45) Date of Patent: Apr. 19, 2022

(54) IMAGE FORMING APPARATUS

(71) Applicant: KYOCERA Document Solutions Inc., Osaka (JP)

(72) Inventors: Satoshi Ishii, Osaka (JP); Motoki Suzuki, Osaka (JP); Hiroaki Watanabe, Osaka (JP); Ryota Okui, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/173,424

(22) Filed: Feb. 11, 2021

(65) Prior Publication Data

US 2021/0252880 A1 Aug. 19, 2021

(30) Foreign Application Priority Data

Feb. 13, 2020 (JP) .............................. JP2020-022564

(51) Int. Cl.
*B41J 11/00* (2006.01)
(52) U.S. Cl.
CPC ........ *B41J 11/0095* (2013.01); *B41J 11/0005* (2013.01)
(58) Field of Classification Search
CPC ...... B41J 11/0095; B41J 11/0005; B41J 2/01; G01N 21/3559
See application file for complete search history.

(56) References Cited

U.S. PATENT DOCUMENTS

| 6,548,813 | B1 | 4/2003 | Fujikawa et al. | |
|---|---|---|---|---|
| 2012/0027483 | A1* | 2/2012 | Hayashihara | B65H 7/14 399/389 |
| 2017/0214812 | A1* | 7/2017 | Tomishima | H04N 1/00734 |
| 2018/0314199 | A1* | 11/2018 | Matsuda | G03G 15/6558 |
| 2019/0171152 | A1* | 6/2019 | Sakakibara | B65H 5/06 |

FOREIGN PATENT DOCUMENTS

WO 00/46033 A1 8/2000

* cited by examiner

*Primary Examiner* — Sharon Polk
(74) *Attorney, Agent, or Firm* — Studebaker & Brackett PC (57) ABSTRACT

An image forming apparatus includes a feeder, a conveyance section, an image forming section, a light emitter, a light receiver, a measuring section, and a permeation depth calculator. The feeder feeds a sheet. The conveyance section conveys the sheet. The image forming section forms an image on the sheet conveyed by the conveyance section using an ink. The light emitter emits near-infrared light to the sheet with the image thereon. The light receiver receives reflected light of the near-infrared light. The reflected light has been reflected by the sheet with the image thereon. The measuring section measures a received light quantity of the reflected light. The permeation depth calculator calculates a permeation depth of the ink permeating the sheet based on the received light quantity.

9 Claims, 8 Drawing Sheets

IMAGE FORMING APPARATUS

INCORPORATION BY REFERENCE

The present application claims priority under 35 U.S.C. § 119 to Japanese Patent Application No. 2020-022564, filed on Feb. 13, 2020. The contents of this application are incorporated herein by reference in their entirety.

BACKGROUND

The present disclosure relates to an image forming apparatus.

SUMMARY

An image forming apparatus according to an aspect of the present disclosure includes a feeder, a conveyance section, an image forming section, a light emitter, a light receiver, a measuring section, and a permeation depth calculator. The feeder feeds a sheet. The conveyance section conveys the sheet. The image forming section forms an image on the sheet conveyed by the conveyance section using an ink. The light emitter emits near-infrared light to the sheet with the image formed thereon. The light receiver receives reflected light of the near-infrared light. The reflected light has been reflected by the sheet with the image thereon. The measuring section measures a received light quantity of the reflected light. The permeation depth calculator calculates a permeation depth of the ink permeating the sheet based on the received light quantity.

DETAILED DESCRIPTION

The following describes embodiments of the present disclosure with reference to the accompanying drawings. Note that elements that are the same or equivalent are labeled with the same reference signs in the drawings and description thereof is not repeated.

Figure 1:
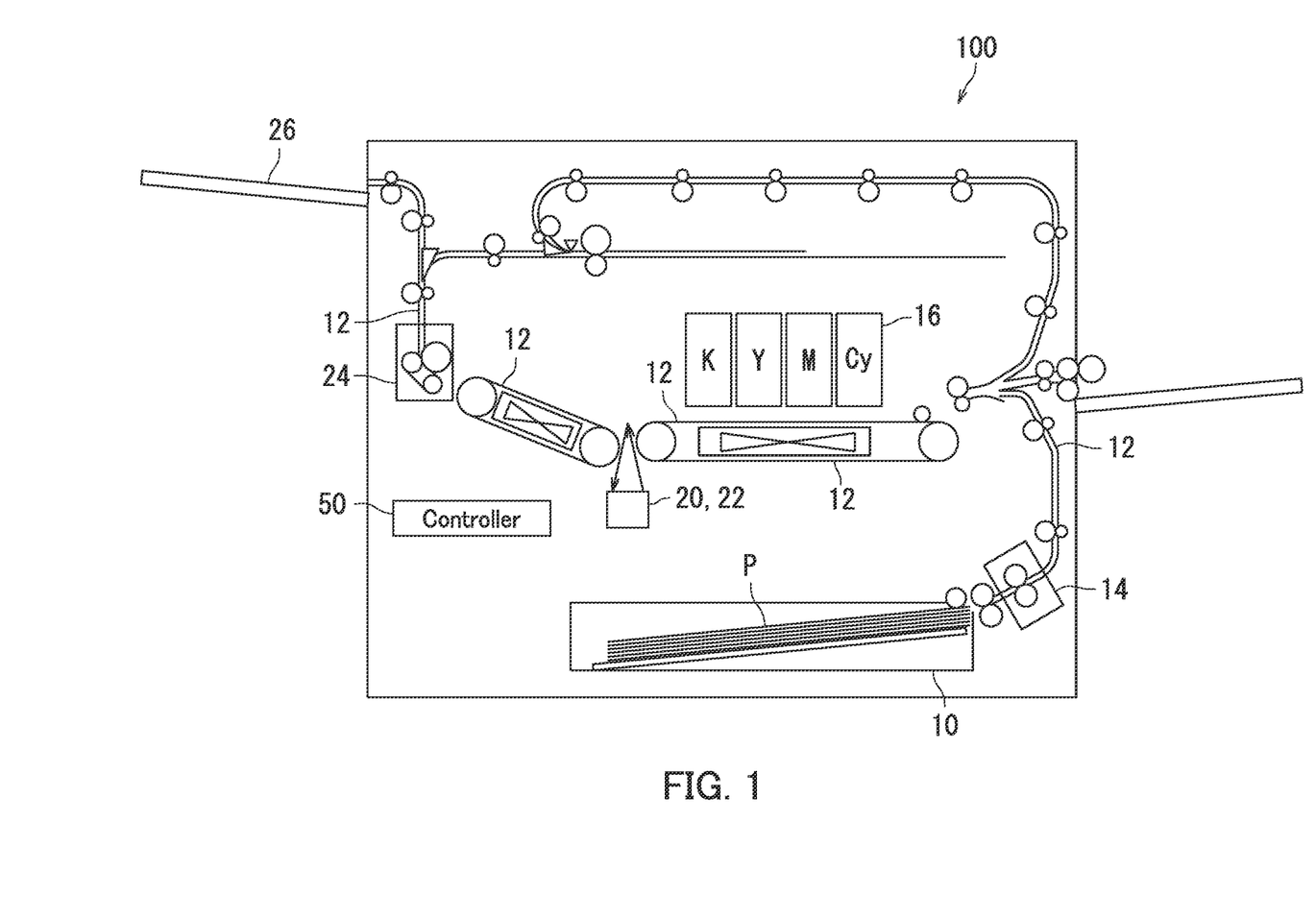
FIG. 1 is a diagram illustrating an image forming apparatus according to an embodiment of the present disclosure.

An image forming apparatus 100 according to an embodiment is described with reference to FIG. 1. FIG. 1 is a diagram illustrating the image forming apparatus 100 of the present embodiment. The present embodiment is applicable to all of the embodiments of the present application.

As illustrated in FIG. 1, the image forming apparatus 100 includes a feeder 10, a conveyance section 12, a detector 14, an image forming section 16, a light emitter 20, a light receiver 22, a correcting section 24, an ejection section 26, and a controller 50.

The image forming apparatus 100 forms an image on a sheet P based on image data using an ink D described later in FIG. 3. A specific example of the image forming apparatus 100 is an inkjet printer. The image forming apparatus 100 is not limited to an inkjet printer.

The feeder 10 feeds the sheet P. The feeder 10 may include a sheet feed tray and a pickup roller. The pickup roller picks up the sheet P placed on the sheet feed tray and feeds the sheet P.

The conveyance section 12 conveys the sheet P. The conveyance section 12 forms a conveyance path extending from the feeder 10 to the ejection section 26.

Figure 3:
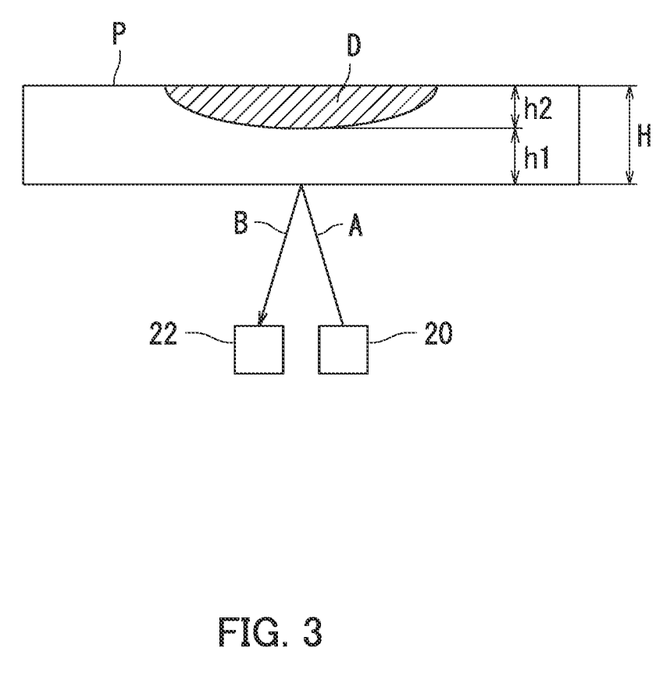
FIG. 3 is a diagram illustrating calculation of a permeation depth of a sheet performed by an image forming apparatus according to a first embodiment.

The detector 14 detects the sheet P fed from the feeder 10 and measures a sheet thickness H (FIG. 3).

The image forming section 16 drops the ink D on the sheet P to form an image on the sheet P.

The light emitter 20 emits light toward the sheet P with an image formed thereon. The light is preferably near-infrared light A (FIG. 3). The light is not limited to near-infrared light.

The light receiver 22 receives reflected light B (FIG. 3) reflected by the sheet P.

The correcting section 24 applies nip pressure to the sheet P with the image formed with the ink D thereon to correct curling in (decurl) the sheet P.

The ejection section 26 ejects the sheet P out of the apparatus. The ejection section 26 may include an exit tray.

Figure 2:
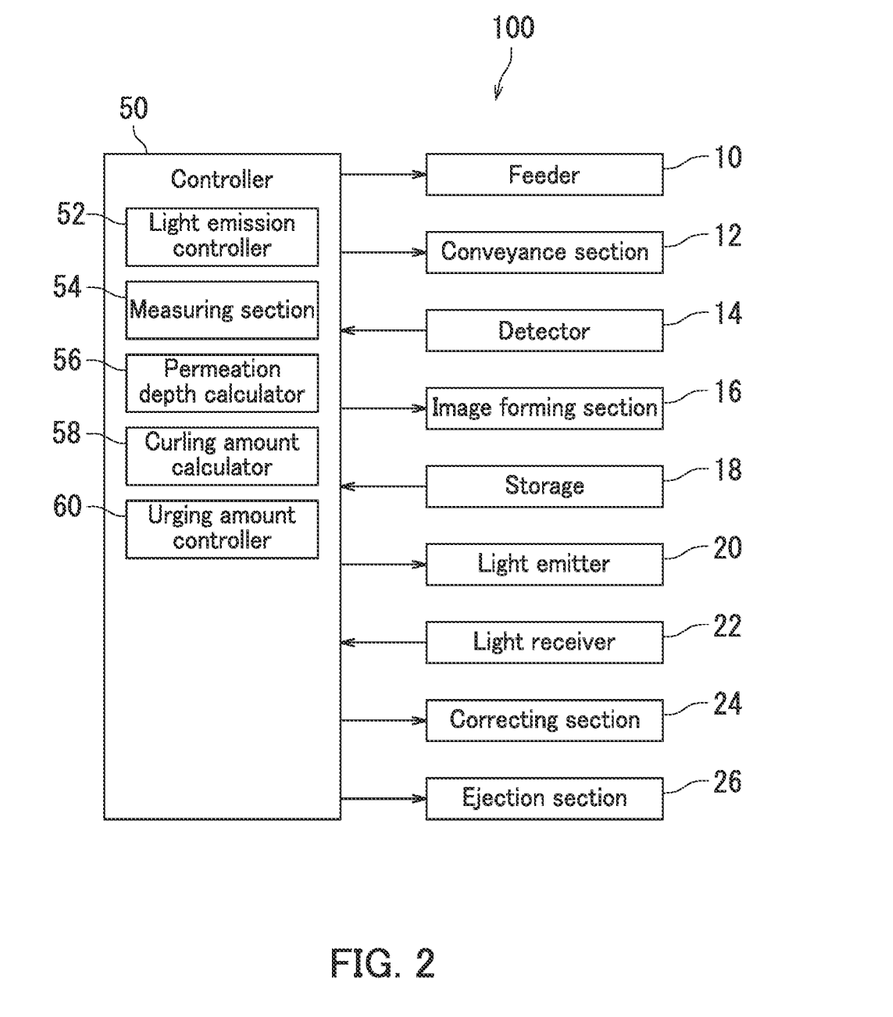
FIG. 2 is a functional block diagram of the image forming apparatus of the embodiment.

Next, a configuration of the image forming apparatus 100 of the present embodiment is described in detail with reference to FIG. 2 in addition to FIG. 1. FIG. 2 is a functional block diagram of the image forming apparatus 100 in the present embodiment. The present embodiment is applicable to all of the embodiments of the present application. Duplicate description with reference to FIG. 2 for constituent elements previously described with reference to FIG. 1 is omitted.

In the following, the constituent elements are described following the flow of information in the image forming apparatus 100.

As illustrated in FIG. 2, the image forming apparatus 100 includes the feeder 10, the conveyance section 12, the detector 14, the image forming section 16, storage 18, the light emitter 20, the light receiver 22, the correcting section 24, the ejection section 26, and the controller 50. The controller 50 controls operation of these constituent elements.

The controller 50 includes a light emission controller 52, a measuring section 54, a permeation depth calculator 56, a curling amount calculator 58, and an urging amount controller 60.

A specific example of the controller 50 is a central processing unit (CPU).

Programs for implementing the light emission controller 52, the measuring section 54, the permeation depth calculator 56, the curling amount calculator 58, and the urging amount controller 60 are installed to the storage 18. The programs are executed by the CPU.

The detector 14 detects the sheet P to determine the sheet thickness H (FIG. 3) of the sheet P fed from the feeder 10. A specific example of the detector 14 is an ultrasonic wave transmitter. An ultrasonic wave transmitter sends ultrasonic transmission waves, which are ultrasonic waves, to the sheet P fed from the feeder 10 and measures the strength of transmitted waves penetrating through the sheet P or reflected waves reflected by the sheet P to determine the sheet thickness H.

The detector 14 may for example be composed by a plurality of opposing rollers along a sheet conveyance path, and the detector 14 may detect the sheet thickness H of the sheet P based on a nip clearance when the sheet P passes between the rollers.

The detector 14 outputs sheet thickness information indicating the sheet thickness H. The detector 14 is not limited to being located in the position indicated in FIG. 1. The detector 14 may be arranged in another position in the conveyance path constituting the conveyance section 12.

The image forming section 16 preferably includes a single inkjet head or a plurality of inkjet heads. The image forming section 16 is not limited to including inkjet heads. In a case in which the image forming apparatus 100 is a color image forming apparatus, an example of the image forming section 16 includes cyan, magenta, yellow, and black inkjet heads. The types of the inkjet heads may be fewer than types of cyan, magenta, yellow, and black, or may be greater than types of cyan, magenta, yellow, and black.

The inkjet heads eject the ink D onto the sheet P. The ink D is supplied to each of the inkjet heads. An example of the ink D is water-based ink. The ink D is not limited to water-based ink. The color of the ink D may differ for each inkjet head.

The storage 18 stores wavelength information therein. The wavelength information indicates a designated wavelength of the near-infrared light A. Specifically, the wavelength information indicates wavelength bands from 1.9 μm to 2.0 μm, from 1.4 μm to 1.5 μm, and from 1.15 μm to 1.25 μm. More specifically, the wavelength information indicates 1.94 μm, 1.45 μm, and 1.2 μm. The wavelength information is one example, and is not limited to these values or wavelength bands.

The storage 18 includes a storage device and stores data and computer programs therein. Specifically, the storage 18 includes a main storage device such as semiconductor memory and an auxiliary storage device such as either or both semiconductor memory and a hard disk drive.

The light emission controller 52 of the controller 50 acquires the wavelength information from the storage 18. The light emission controller 52 sets the wavelength of the near-infrared light A emitted by the light emitter 20 based on the wavelength information. The near-infrared light A is an electromagnetic wave with a wavelength of approximately 0.7 μm to 2.5 μm, which is close to that of visible red light. The wavelength of the near-infrared light A is not limited to 0.7 μm to 2.5 μm.

As described later with reference to FIG. 3, the near-infrared light A is radiated from the light emitter 20 to the sheet P, and the reflected light B reflected by the sheet P is received by the light receiver 22. As described later with reference to FIG. 4, the reflected light B has near-infrared absorption characteristics distinct to a moisture content S of the ink D retained in the sheet P. Therefore, the light quantity of the reflected light B is used to calculate a permeation depth h2 of the ink D applied to the sheet P.

The light emission controller 52 can set a specific wavelength range of the near-infrared light A through a user setting.

The light emitter 20 emits the near-infrared light A to the sheet P. That is, the light emitter 20 emits the near-infrared light A in a wavelength band set by the light emission controller 52. A specific example of the light emitter 20 is a light-emitting diode (LED).

The light receiver 22 receives the reflected light B of the near-infrared light A. That is, the light receiver 22 receives the reflected light B which is the near-infrared light A emitted by the light emitter 20 and reflected by the sheet P.

Specific examples of the light receiver 22 include a charge-coupled device (CCD) and a complementary metal-oxide-semiconductor (CMOS) image sensor. In a case in which the light receiver 22 is a CCD, for example, an amount of stored charge changes according to a received light quantity a of the reflected light B.

The light emitter 20 and the light receiver 22 are arranged downstream of the image forming section 16 in a conveyance direction of the sheet P.

The measuring section 54 of the controller 50 senses the received light quantity a of the reflected light B. That is, the measuring section 54 measures the received light quantity a of the reflected light B received by the light receiver 22 and outputs light quantity information indicating the received light quantity a of the reflected light B.

The storage 18 further stores therein a function indicating the relationship between the permeation depth h2 of the ink D permeating the sheet P and the received light quantity a. The storage 18 may store a prescribed function f(a) therein. The storage 18 may store therein a table indicating the relationship between the permeation depth h2 and the received light quantity a.

The permeation depth h2 of the ink D permeating the sheet P is given by a permeation depth calculation formula (formula 1).

$$h_2 = f(a) \qquad \text{(formula 1)}$$

The permeation depth calculator 56 of the controller 50 calculates the permeation depth h2 of the ink D based on the received light quantity a. As described later with reference to FIG. 3, the permeation depth h2 is a depth to which the ink D dropped onto the sheet P has soaked into the sheet P.

Specifically, the permeation depth calculator 56 calculates the permeation depth h2 by reading out (formula 1) from the storage 18 and substituting the received light quantity a into the function f(a).

As described later with reference to FIG. 5, the relationship between the received light quantity a of the reflected light B of the near-infrared light A and the moisture content S of the ink D applied to the sheet P is characterized such that the received light quantity a of the reflected light B increases as the moisture content S of the ink D decreases and the received light quantity a of the reflected light B decreases as the moisture content S of the ink D increases.

Accordingly, the permeation depth h2 being calculated based on the received light quantity a of the reflected light B received by the light receiver 22 means that the permeation depth h2 is calculated based on the moisture content S in the sheet P.

First, since the sheet thickness H is detected by the detector 14, a non-permeation depth h1 is calculated from the permeation depth h2 and H=h1+h2 as illustrated in FIG. 3. The non-permeation depth h1 and the permeation depth h2 are used to calculate a later-described curvature 1/R of curling of the sheet P.

The storage 18 further stores a curvature calculation formula and a curling amount calculation formula therein. The storage 18 is not limited to storing all of these formulas. The storage 18 may store some of these formulas.

The curvature 1/R of curling of the sheet P is given by the curvature calculation formula (formula 2).

$$\frac{1}{R} = \frac{6(\varepsilon_2 - \varepsilon_1)(h_1 + h_2)h_1 h_2 E_1 E_2}{3(h_1 + h_2)^2 h_1 h_2 E_1 E_2 + (h_1 E_1 + h_2 E_2)(h_1^3 E_1 + h_2^3 E_2)} \quad \text{(formula 2)}$$

A curling amount δ of curling of the sheet P is given by the curling amount calculation formula (formula 3).

$$\delta = \frac{L^2}{2R} \quad \text{(formula 3)}$$

Figure 6:
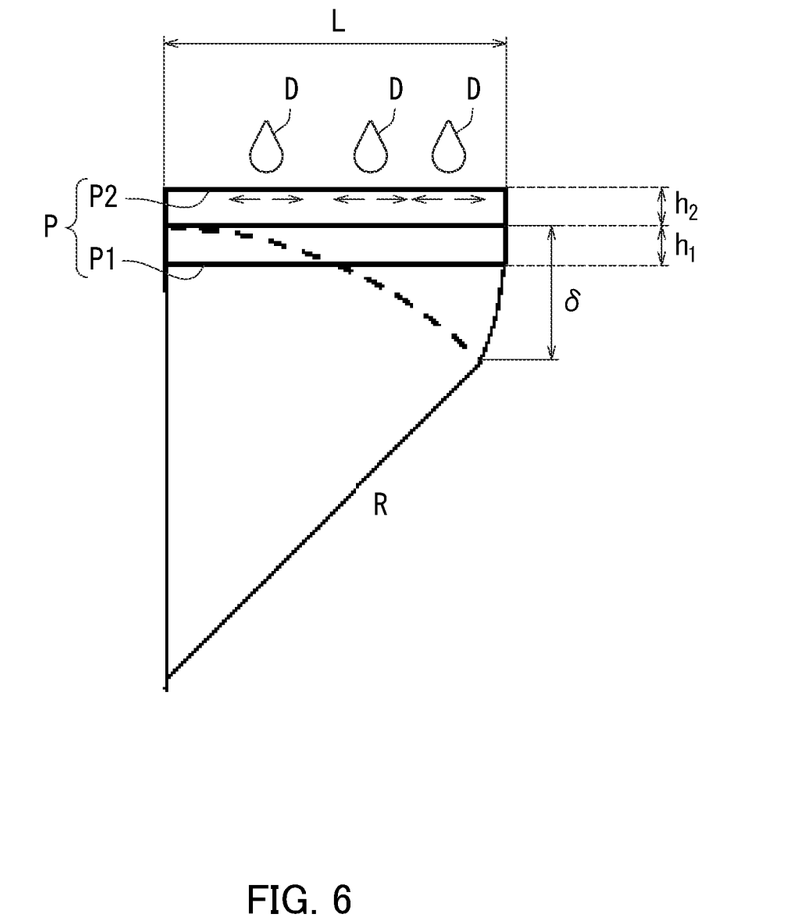
FIG. 6 is a diagram illustrating curling of a sheet in an image forming apparatus according to a second embodiment.

With reference to FIG. 6, (formula 2) and (formula 3) are described in detail later.

The curling amount calculator 58 of the controller 50 substitutes the permeation depth h2 for (formula 2) to calculate the curvature 1/R and substitutes the curvature 1/R for (formula 3) to calculate the curling amount δ.

The correcting section 24 includes a roller and decurls the sheet P. Specifically, as illustrated in FIG. 1, the correcting section 24 is arranged downstream of the light emitter 20 and the light receiver 22 and upstream of the ejection section 26 in the conveyance path of the conveyance section 12.

The correcting section 24 is composed by a combination of a plurality of rollers, and the sheet P is decurled by the sheet P passing through nips of the rollers.

The urging amount controller 60 of the controller 50 adjusts the urging amount of the rollers of the correcting section 24 on the sheet P based on the curling amount δ calculated by the curling amount calculator 58. That is, when the curling amount δ is small, the urging amount controller 60 decreases the urging amount of the rollers. When the curling amount δ is large, the urging amount controller 60 increases the urging amount of the rollers. The rollers may be combined so as to apply the urging force in a direction opposite to the direction in which the sheet P curls.

The ejection section 26 ejects the sheet P that has been decurled by the correcting section 24 out of the apparatus. The ejection section 26 is arranged at the end of the conveyance path of the conveyance section 12 and uses rollers to eject the sheet P. The ejection section 26 may include an exit tray. The sheet P ejected by the rollers is placed on the exit tray.

First Embodiment

Next, an image formation process performed by an image forming apparatus 100 according to a first embodiment is described with reference to FIGS. 3 to 5 in addition to FIGS. 1 and 2.

FIG. 3 is a diagram illustrating the calculation of the permeation depth h2 of the sheet P performed by the image forming apparatus 100 of the first embodiment. FIG. 4 is a diagram illustrating the relationship between a wavelength band and an absorbance of the near-infrared light A emitted by the light emitter 20 of the image forming apparatus 100 in the first embodiment. FIG. 5 is a diagram illustrating the relationship between the moisture content S in the sheet P and the reflected light B in the image forming apparatus 100 of the first embodiment. The first embodiment is applicable to all embodiments of the present application.

In the first embodiment, the image forming apparatus 100 includes the feeder 10, the conveyance section 12, the image forming section 16, the light emitter 20, the light receiver 22, the measuring section 54, and the permeation depth calculator 56. The feeder 10 feeds a sheet P. The conveyance section 12 conveys the sheet P. The image forming section 16 forms an image with the ink D on the sheet P.

The light emitter 20 emits the near-infrared light A to the sheet P. The light receiver 22 receives the reflected light B of the near-infrared light A. The measuring section 54 measures the received light quantity a of the reflected light B. The permeation depth calculator 56 calculates the permeation depth h2 of the ink D based on the received light quantity a.

The light emitter 20 and the light receiver 22 are arranged on a side of the sheet P, which is being conveyed by the conveyance section 12, opposite to a side thereof to which the ink D has been applied.

The light emitter 20 has a light emitting element which emits the near-infrared light A in any of the following wavelength bands: 1.9 μm to 2.0 μm, 1.4 μm to 1.5 μm, and 1.15 μm to 1.25 μm.

The light emitting element preferably emits the near-infrared light A with a wavelength of 1.94 μm.

The light receiver 22 has a photo detector which receives the reflected light B in any of the following wavelength bands: 1.9 μm to 2.0 μm, 1.4 μm to 1.5 μm, and 1.15 μm to 1.25 μm.

The photo detector preferably receives the reflected light B with a wavelength of 1.94 μm.

As illustrated in FIG. 1, the feeder 10 feeds a sheet P. The conveyance section 12 conveys the sheet P. The detector 14 detects the sheet thickness H of the sheet P fed from the feeder 10 (FIG. 3). The image forming section 16 drops the ink D onto the sheet P to form an image on the sheet P.

When the ink D is dropped onto the sheet P, the ink D permeates the sheet P to the permeation depth h2. Here, the sheet thickness H is the sum of the permeation depth h2 and the non-permeation depth h1. The permeation depth h2 and the non-permeation depth h1 are used to calculate the curvature 1/R of curling of the sheet P in a second embodiment described with reference to FIG. 6.

As illustrated in FIG. 3, the light emitter 20 emits the near-infrared light A toward the sheet P with an image formed thereon. The light receiver 22 receives the reflected light B reflected by the sheet P.

In the first embodiment, the light emitter 20 and the light receiver 22 are preferably arranged on the side of the sheet P opposite to the side thereof to which the ink D has been applied. That is, the light emitter 20 and the light receiver 22 are preferably arranged facing the side of the sheet P to which the ink D is not applied. Additionally, the light emitter 20 radiates the near-infrared light A toward the side of the sheet P opposite to the side thereof to which the ink D has been applied and the light receiver 22 receives the reflected light B reflected by the side of the sheet P opposite to the side to which the ink D has been applied.

This is because when the light emitter 20 and the light receiver 22 are arranged on the side of the sheet P to which the ink D has been applied, the light receiver 22 cannot favorably receive the light to a received light quantity a corresponding to the permeation depth h2 of the ink D because the near-infrared light A emitted from the light emitter 20 is scattered by the moisture of the ink D.

According to the present embodiment, dispersion of the reflected light B is suppressed and the received light quantity a corresponding to the permeation depth h2 of the ink D can be received to a preferred degree by arranging the light emitter 20 and the light receiver 22 on the side of the sheet P, which is being conveyed by the conveyance section 12, opposite to the side thereof to which the ink D has been applied.

Figure 4:
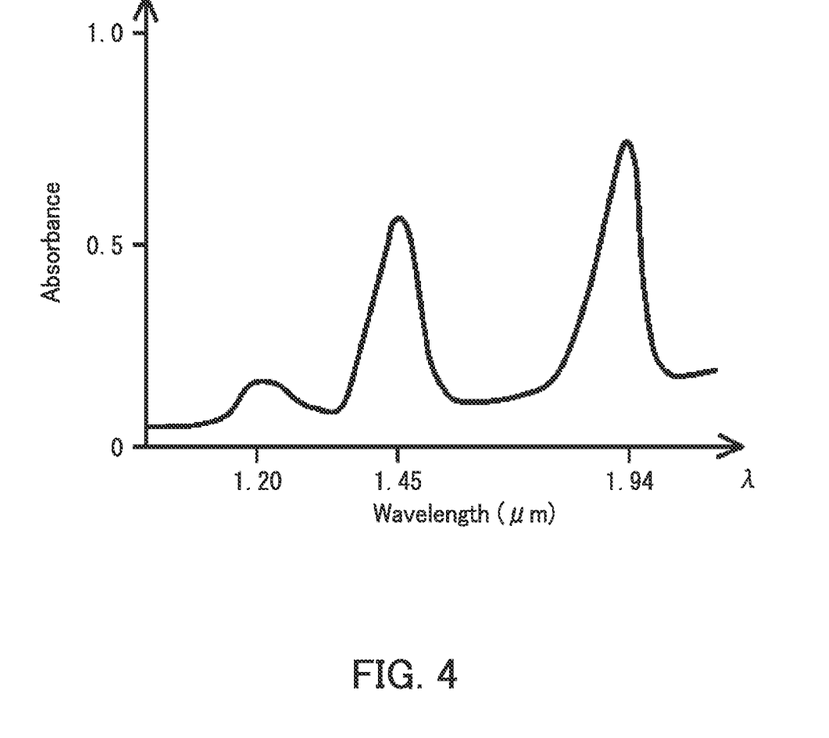
FIG. 4 is a diagram illustrating the relationship between the wavelength band and the absorbance of near-infrared light emitted by a light emitter of the image forming apparatus in the first embodiment.

Here, as illustrated in FIG. 4, the absorbance at which the near-infrared light A emitted by the light emitter 20 is absorbed in moisture varies depending on the wavelength band of the near-infrared light A. The absorbance indicates a proportion of the light quantity absorbed by the moisture in the sheet P to the light quantity of the near-infrared light A. That is, as the absorbance increases, the near-infrared light A is increasingly absorbed by the moisture in the sheet P, and as the absorbance decreases, the near-infrared light A is increasingly reflected without being absorbed by the moisture in the sheet P.

When the wavelength band of the near-infrared light A is 1.9 µm to 2.0 µm, 1.4 µm to 1.5 µm, or 1.15 µm to 1.25 µm, the absorbance is generally high, and the absorbance peaks at 1.94 µm, 1.45 µm, and 1.2 µm.

Accordingly, the light emitting element of the light emitter 20 emits the near-infrared light A in any of the following wavelength bands: 1.9 µm to 2.0 µm, 1.4 µm to 1.5 µm, and 1.15 µm to 1.25 µm. The light emitting element of the light emitter 20 preferably emits the near-infrared light A with any of the following wavelengths: 1.94 µm, 1.45 µm, and 1.2 µm. The light emitting element of the light emitter 20 more preferably emits the near-infrared light A with a wavelength of 1.94 µm.

The photo detector of the light receiver 22 receives the reflected light B in any of the following wavelength bands: 1.9 µm to 2.0 µm, 1.4 µm to 1.5 µm, and 1.15 µm to 1.25 µm. The photo detector of the light receiver 22 preferably receives the reflected light B with any of the following wavelengths: 1.94 µm, 1.45 µm, and 1.2 µm. The photo detector of the light receiver 22 more preferably receives the reflected light B with a wavelength of 1.94 µm.

Figure 5:
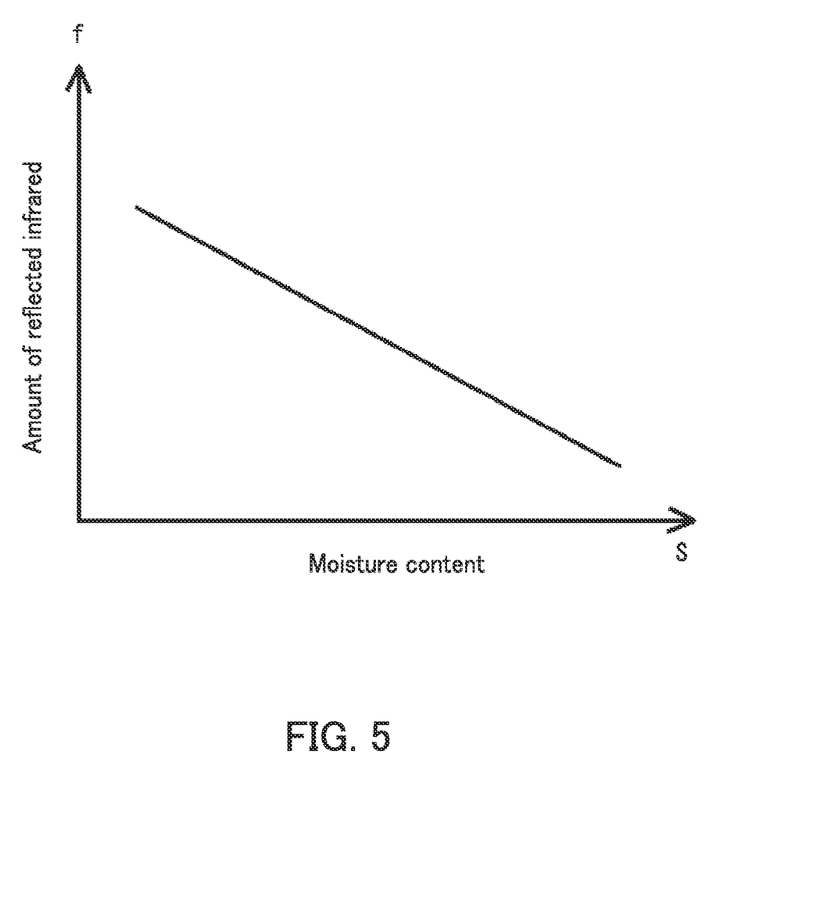
FIG. 5 is a diagram illustrating the relationship between the moisture content of the sheet and a reflected wave in the image forming apparatus of the first embodiment.

The reason that the reflected light B of the near-infrared light A is used to calculate the permeation depth h2 of the ink D is due to the relationship between the reflected light B and the moisture content S as illustrated in FIG. 5. FIG. 5 illustrates a linear function as an example. The relationship between the reflected light B and the moisture content S is not limited to a linear function.

As the amount of the ink D permeating the sheet P, that is, the moisture content S of the ink D decreases, the permeation depth h2 of the ink D decreases. As the moisture content S of the ink D increases, the permeation depth h2 of the ink D increases.

As illustrated in FIG. 5, as the moisture content S of the ink D decreases, the light quantity of the reflected light B of the near-infrared light A increases, and as the moisture content S of the ink D increases, the light quantity of the reflected light B of the near-infrared light A decreases.

Accordingly, calculating the permeation depth h2 of the ink D based on the reflected light B of the near-infrared light A means calculating the permeation depth h2 of the ink D based on the moisture content S of the ink D.

According to the present embodiment, by irradiating the sheet P with the near-infrared light A, the permeation depth h2 of the ink D permeating the sheet P according to the amount of the ink D applied to the sheet P can be more preferably calculated for preferably calculating the curling amount δ of the sheet P.

Also according to the present embodiment, the reflected light B with a high absorbance can be measured by the light emitter 20 including a light emitting element which emits the near-infrared light A in any of the following wavelength bands: 1.9 to 2.0 µm, 1.4 to 1.5 µm, and 1.15 to 1.25 µm.

Also according to the present embodiment, the reflected light B with a high absorbance can be more preferably measured by the light emitting element emitting the near-infrared light A with a wavelength of 1.94 µm.

Also according to the present embodiment, the reflected light B with a high absorbance can be measured by the light receiver 22 including a photo detector which receives the reflected light B in any of the following wavelength bands: 1.9 to 2.0 µm, 1.4 to 1.5 µm, and 1.15 to 1.25 µm.

Also according to the present embodiment, the reflected light B with a high absorbance can be more preferably measured by the photo detector receiving the reflected light B with a wavelength of 1.94 µm.

Second Embodiment

Next, an image formation process performed by an image forming apparatus 100 according to a second embodiment is described with reference to FIG. 6 in addition to FIGS. 1 to 5. FIG. 6 is a diagram illustrating curling of a sheet P in the image forming apparatus 100 according to the second embodiment.

In the second embodiment, the image forming apparatus 100 includes storage 18 and a curling amount calculator 58. The storage 18 stores a curvature calculation formula and a curling amount calculation formula therein. The curling amount calculator 58 substitutes the permeation depth h2 into the curvature calculation formula (formula 2) to calculate the curvature 1/R and substitutes the curvature 1/R into the curling amount calculation formula (formula 3) to calculate the curling amount δ. The second embodiment is applicable to all embodiments of the present application.

As illustrated in FIG. 6, the sheet P curls by the curling amount δ due to the ink D being applied thereto. In the present embodiment, a curling model is used to calculate the curling amount δ. As to the curling model, for example, the sheet P is thought of as a sheet P1 with a sheet thickness h1 (non-permeation depth h1) and a sheet P2 with a sheet thickness h2 (permeation depth h2) which are layered and bonded together. The sheets P1 and P2 differ in material properties.

When the ink D is dropped onto the sheet P2 side, the sheet P1 which is not permeated by the ink D does not expand while the sheet P2 which is permeated by the ink D does expand. Accordingly, the sheet P curls downward by the curling amount δ at a curvature radius R due to the difference in expansion between the sheets P1 and P2.

The permeation depth h2, (formula 2), and (formula 3) described in the first embodiment are used to calculate the curling amount δ. The storage 18 may store (formula 2) and (formula 3) therein.

In (formula 2) for calculating the curvature 1/R, an elongation ε1 of the sheet P1 and an elongation ε2 of the sheet P2 are constants based on respective characteristics of the sheets P1 and P2. The non-permeation depth h1 of the sheet P1 is calculated using the sheet thickness H of the sheet P calculated in the first embodiment and the sheet thickness h2 (permeation depth h2) of the sheet P2.

A modulus E of longitudinal elasticity is for example a proportional coefficient of "strain" and "tensile stress" occurring when the sheet P is pulled. A modulus E1 of longitudinal elasticity is a constant specified by the material of the sheet P1. A modulus of longitudinal elasticity E2 is a constant specified by the material of the sheet P2.

Accordingly, the curvature 1/R is calculated by substituting these values into (formula 2).

In (formula 2), a sheet length L is a constant specified by the sheet P. Accordingly, the curling amount calculator 58 calculates the curling amount δ by substituting the curvature 1/R and the sheet length L into (formula 3).

According to the present embodiment, the curling amount δ of the sheet P is preferably calculated using the permeation depth h2 of the ink D calculated in the first embodiment and (formula 2) and (formula 3) to which the curling model has been applied.

Third Embodiment

Next, an image formation process performed by an image forming apparatus 100 according to a third embodiment is described with further reference to FIGS. 1 to 6.

In the third embodiment, the image forming apparatus 100 includes a correcting section 24 and an urging amount controller 60. The correcting section 24 includes rollers and decurls a sheet P. The urging amount controller 60 adjusts the urging amount of the rollers of the correcting section 24 on the sheet P based on the curling amount δ. The third embodiment is applicable to all embodiments of the present application.

As illustrated in FIG. 1, the light emitter 20 and the light receiver 22 are arranged downstream of the image forming section 16 in the conveyance direction of the sheet P. The correcting section 24 is arranged farther downstream of the light emitter 20 and the light receiver 22 and upstream of the ejection section 26 in the conveyance path of the conveyance section 12.

The image forming section 16 applies the ink D to the sheet P, causing the sheet P to curl due to the addition of moisture. The curling amount calculator 58 calculates the curling amount δ when the sheet P passes the light emitter 20 and the light receiver 22.

The correcting section 24 is composed by a combination of a plurality of rollers, and decurls the sheet P when the sheet P passes through nips of the rollers.

For example, as described by the second embodiment (FIG. 6), the sheet P curls toward a side of the sheet P (sheet P2) opposite to the side thereof on which the ink D has been applied. Therefore, as illustrated in FIG. 1, the correcting section 24 can decurl the sheet P in such a manner that one roller arranged on a side of the sheet P2 urges the sheet P toward a plurality of rollers arranged on a side of the sheet P1.

The urging amount controller 60 of the controller 50 adjusts the urging amount of the rollers of the correcting section 24 on the sheet P to an appropriate amount based on the curling amount δ calculated by the curling amount calculator 58.

According to the present embodiment, the sheet P can be preferably decurled.

Also according to the present embodiment, the sheet P can be more preferably decurled because the urging amount of the rollers can be adjusted based on the curling amount δ calculated from the permeation depth h2 of the ink D permeating the sheet P.

Figure 7:
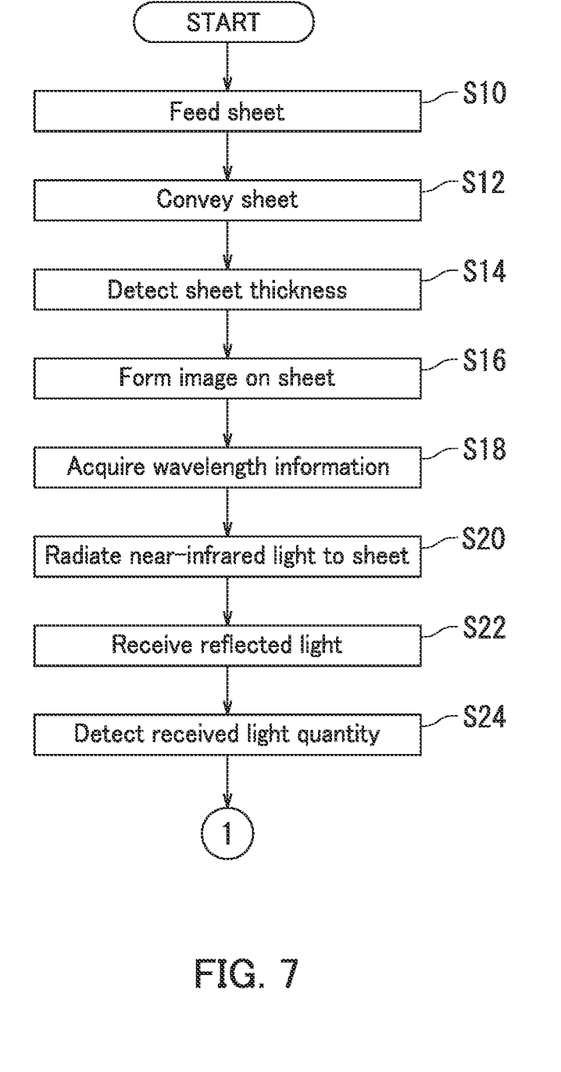
FIG. 7 is a flowchart depicting control of an image forming apparatus according to first to third embodiments.
Figure 8:
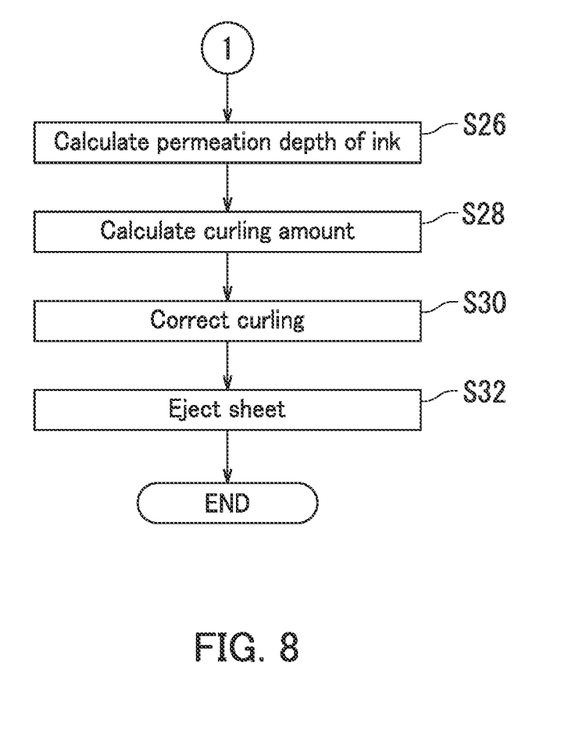
FIG. 8 is a flowchart depicting control of the image forming apparatus in the first to third embodiments.

Next, a control flow of the image forming apparatus 100 according to any of the first to third embodiments is described with reference to FIGS. 7 and 8. FIGS. 7 and 8 are flowcharts depicting the control of the image forming apparatus 100 according to any of the first to third embodiments.

As illustrated in FIGS. 7 and 8, the process includes Steps S10 to S32. A specific description is as follows.

As illustrated in FIG. 7, the feeder 10 feeds a sheet P in Step S10. The process advances to Step S12.

In Step S12, the conveyance section 12 conveys the sheet P. The process advances to Step S14.

In Step S14, the detector 14 detects the sheet thickness H. The process advances to Step S16.

In Step S16, the image forming section 16 forms an image on the sheet P. The process advances to Step S18.

In Step S18, the light emission controller 52 acquires the wavelength information. The process advances to Step S20.

In Step S20, the light emitter 20 emits the near-infrared light A to the sheet P. The process advances to Step S22.

In Step S22, the light receiver 22 receives the reflected light B of the near-infrared light A. The process advances to Step S24.

In Step S24, the measuring section 54 senses the received light quantity a of the reflected light B. The process advances to Step S26.

As illustrated in FIG. 8, the permeation depth calculator 56 calculates the permeation depth h2 of the ink D based on the received light quantity a in Step S26. The process advances to Step S28.

In Step S28, the curling amount calculator 58 calculates the curling amount δ. The process advances to Step S30.

In Step S30, the correcting section 24 decurls the sheet P. The process advances to Step S32.

In Step S32, the ejection section 26 ejects the sheet P out of the apparatus. The process then ends.

Embodiments of the present disclosure are described above with reference to the accompanying drawings. However, the present disclosure is not limited to the above embodiments and may be implemented in various manners within a scope not departing from the gist thereof. Furthermore, various disclosures may be created by appropriately combining constituent elements disclosed in the above embodiments. For example, some constituent elements may be removed from all of the constituent elements illustrated in the embodiments. In addition, the constituent elements may be appropriately combined across different embodiments. The drawings mainly illustrate the constituent elements schematically to facilitate understanding thereof. The constituent elements may differ in practice for convenience of drawing preparation. Furthermore, the constituent elements illustrated in the above embodiments are each one example and not particular limitations. The constituent elements may be variously altered within a scope not substantially departing from the configuration of the present disclosure.

What is claimed is:

1. An image forming apparatus comprising:
   a feeder configured to feed a sheet;
   a conveyance section configured to convey the sheet;
   an image forming section configured to form an image on the sheet conveyed by the conveyance section using an ink;
   a light emitter configured to emit near-infrared light to the sheet with the image thereon;
   a light receiver configured to receive reflected light of the near-infrared light, the reflected light having been reflected by the sheet with the image thereon;
   a measuring section configured to measure a received light quantity of the reflected light; and
   a permeation depth calculator configured to calculate a permeation depth of the ink permeating the sheet based on the received light quantity.

2. The image forming apparatus according to claim 1, wherein
   the near-infrared light is in any of the following wavelength bands: 1.9 to 2.0 µm, 1.4 to 1.5 µm, or 1.15 to 1.25 μm, and the light emitter includes a light emitting element which emits the near-infrared light.

3. The image forming apparatus according to claim 2, wherein
the near-infrared light emitted by the light emitting element has a wavelength of 1.94 μm.

4. The image forming apparatus according to claim 1, wherein
the reflected light is in any of the following wavelength bands: 1.9 to 2.0 μm, 1.4 to 1.5 μm, or 1.15 to 1.25 μm, and the light receiver includes a photo detector which receives the reflected light.

5. The image forming apparatus according to claim 4, wherein
the reflected light received by the photo detector has a wavelength band of 1.94 μm.

6. The image forming apparatus according to claim 1, wherein
the light emitter and the light receiver are arranged on a side of the sheet, which is being conveyed by the conveyance section, opposite to a side thereof on which the ink has been applied.

7. The image forming apparatus according to claim 1, further comprising:
storage that stores a curvature calculation formula and a curling amount calculation formula therein; and
a curling amount calculator configured to substitute the permeation depth into the curvature calculation formula to calculate a curvature of curling of the sheet and substitute the curvature into the curling amount calculation formula to calculate a curling amount of the curling of the sheet.

8. The image forming apparatus according to claim 7, further comprising
a correcting section with a roller, configured to decurl the sheet.

9. The image forming apparatus according to claim 8, further comprising
an urging amount controller configured to adjust an urging amount of the roller of the correcting section on the sheet based on the curling amount.

* * * * *